(No Model.)
T. A. KEARNS.
GATE.
No. 435,347. Patented Aug. 26, 1890.
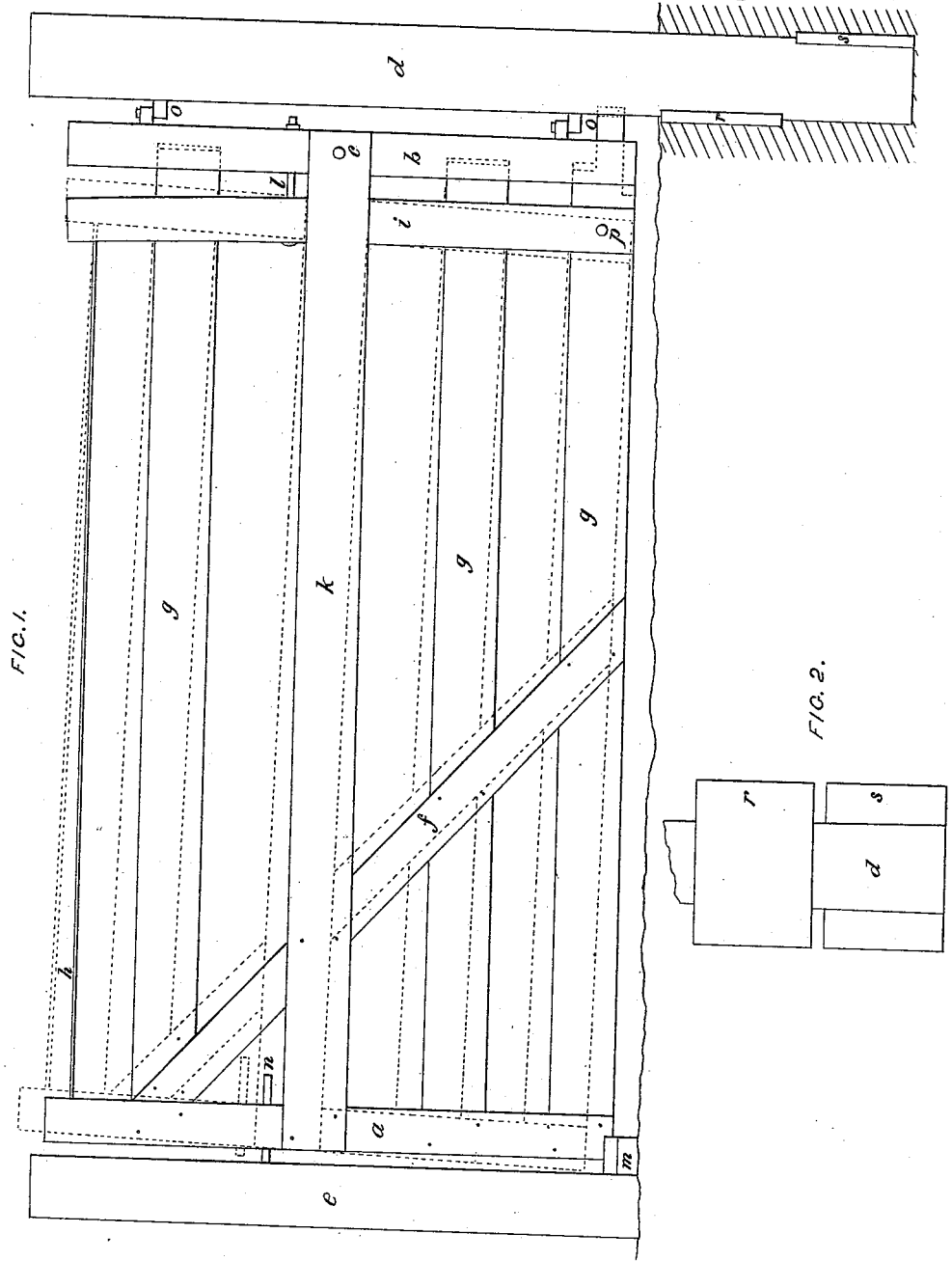
WITNESSES.
G. W. Cornell
C. L. Tripp
INVENTOR.
Thomas A. Kearns
by D. P. Lipton
Attorney

UNITED STATES PATENT OFFICE.

THOMAS A. KEARNS, OF SOUTH AUBURN, NEBRASKA.

GATE.

SPECIFICATION forming part of Letters Patent No. 435,347, dated August 26, 1890.

Application filed June 2, 1890. Serial No. 353,945. (No model.)

*To all whom it may concern:*

Be it known that I, THOMAS A. KEARNS, a citizen of the United States, residing at South Auburn, in the county of Nemaha and State of Nebraska, have invented a new and useful Improvement in Gates, of which the following is a specification.

My invention relates to that class of gates which when released by the securing bolt or latch at once automatically spring or rise at their free or forward ends, so as to clear the foot rest or stop and any obstructions that might be in their paths. I attain this object by the mechanism shown in the accompanying drawings, in which—

Figure 1 is a side view of the gate. Fig. 2 is a front view of the lower extremity of the hinging gate-post.

Similar letters refer to similar parts in the two figures.

The bars $g$ are permanently fastened to the forward bar $a$, but are allowed room in mortises in the bar $b$ for longitudinal and slight vertical movement. The bar $b$ is attached by free hinges $o$ to the hinging gate-post $d$ in such manner as to allow the free end of the gate to swing past the closing gate-post $e$ in either direction, the gate thus swinging half around the post $d$. The brace $f$ extends from the middle of the lower bar $g$ to the upper part of the bar $a$, and is permanently fastened to said post and to the bars $g$. Rigidly secured to the sides of the front bar $a$ and to the brace $f$ are two pivot-bars $k$, which extend rearward to the bar $b$, to which they are pivoted at $c$, said bars including between them the spring-post $i$. It will be noticed that the gate members $a$, $g$, $f$, and $k$ form a rigid structure relative to each other, and that their center of motion under the action of the spring tension mechanism, now to be described, is on the pivot $c$ in the rear or hinge bar $b$. A tension rod or wire $h$ is attached to the upper part of the bar $a$, and is passed along above the upper bar $g$ and attached to the upper part of the spring-post $i$, which is pivoted near its lower extremity by a bolt $p$ to the lower bar $g$ at a point a little in front of the bar $b$, from which point it extends upward, being connected with the bar $b$ by a tension-bolt $l$, extending horizontally through the spring-post $i$ and the bar $b$. The tension-bolt $l$ is provided at one end with a flat head and at the other with a nut for the purpose of drawing the spring-post $i$ backward toward the bar $b$, thus tightening the tension-rod $h$ and at the same time bringing into operation the elastic force of the spring-post $i$, which operates to raise the free end of the gate sufficiently to clear all ordinary obstacles, all of the gate except the bar $b$ pivoting at $c$. When the gate is closed, the lower end of the bar $a$ is pressed down into a groove in the ground-brace $m$ and is retained in that position against the tension of the spring $i$ by the bolt $n$, extending into the post $e$. When said bolt is withdrawn, the force of the spring $i$ immediately raises the gate, as shown by dotted lines.

Any kind of spring may be substituted for the post or bar spring $i$. For instance, a flat, coiled, or other metal spring would answer the purpose, all that is necessary being some provision for increasing the tension when necessary. It will be noticed that the lower bar $g$ is extended through the bar $b$ to enter a mortise in the hinging gate-post $d$, so as to afford a bearing for the rear end of the gate in said gate-post when the gate is closed and latched, whereby additional security against displacement is provided. Obviously more than one of the bars $g$ might be so extended, in which case the post $d$ would be correspondingly mortised. The sagging of the gate is further prevented by attaching to that surface of the post $d$ which bears the hinges just below the ground a piece of timber $r$, of convenient dimensions, extending outward on each side of the post, thus presenting to the ground a greater extent of surface than that presented merely by the post and operating to hold the post and gate in proper position. A similar member $s$ is attached to the post $d$ at the lower portion of the surface opposite to that bearing the hinges and operates in the same manner as the member $r$.

Having thus described my invention, what I claim, and desire to secure by Letters Patent, is—

1. A gate consisting of a rigid frame portion pivoted to a rear swinging hinge-post and having a spring tension device and a securing-bolt for fastening, whereby said rigid frame portion is raised or swung upon its pivot to clear obstructions when its securing devices are released, substantially as shown and described.

2. In a gate, the combination, with a rigid frame-section consisting of a vertical front post or member, horizontal bars, a brace-bar, and pivot-bars, of a rear swinging hinge-post which receives the free ends of said horizontal bars and to which said pivot-bars are pivoted and a spring tension device for raising said frame-section, substantially as shown and described.

3. In a gate, the combination, with a pivoted frame-section, of the tension-rod $h$, the spring-post $i$, and the tension-bolt $l$.

4. In a gate, the combination of the tension-rod $h$, the spring-post $i$, the tension-bolt $l$, and the adjustable bars $g$.

5. The combination of the bar $a$, bars $g$, brace $f$, pivot-bars $k$, bar $b$, and tension device $i$, $l$, and $h$, with the fixed posts $e$ and $d$ and the foot-rest or ground-brace $m$, all substantially as shown and described.

THOMAS A. KEARNS.

Witnesses:
G. W. CORNELL,
C. L. TRIPP.